United States Patent

Menz et al.

[11] Patent Number: 5,443,013
[45] Date of Patent: Aug. 22, 1995

[54] SELF STEERING RECREATIONAL APPARATUS FOR TROUGH-SHAPED RAILWAYS

[75] Inventors: Peter Menz, Hünfeld; Josef Wiegand, Landstrasse 12, D-6419 Rasdorf, both of Germany

[73] Assignee: Josef Wiegand, Rasdorf, Germany

[21] Appl. No.: 978,964

[22] Filed: Nov. 23, 1992

[30] Foreign Application Priority Data

Nov. 22, 1991 [DE] Germany ............ 41 38 442.3

[51] Int. Cl.6 ........................... A63G 21/02
[52] U.S. Cl. .................... 104/69; 280/113
[58] Field of Search ............ 104/53, 69, 75; 280/87.01, 113, 117, 118, 133, 134

[56] References Cited

U.S. PATENT DOCUMENTS

| | | |
|---|---|---|
| 1,400,497 | 12/1921 | Cudlipp .................. 104/53 |
| 1,745,241 | 1/1930 | Bartlett . |
| 1,959,944 | 5/1934 | Bartlett . |
| 2,081,261 | 5/1937 | Bartlett . |
| 2,539,360 | 1/1951 | Bartlett . |
| 4,417,740 | 11/1983 | Wechsler ............ 104/69 X |

FOREIGN PATENT DOCUMENTS

| | | |
|---|---|---|
| 0003287 | 8/1979 | European Pat. Off. . |
| 805743 | 5/1951 | Germany . |
| 848771 | 9/1952 | Germany . |
| 1895527 | 6/1964 | Germany . |
| 1271151 | 6/1968 | Germany . |
| 2917074 | 11/1980 | Germany . |
| 3117260 | 5/1982 | Germany . |
| 9114565 | 3/1992 | Germany . |
| 81566 | 5/1956 | Netherlands . |
| 740549 | 6/1980 | U.S.S.R. . |

*Primary Examiner*—Robert J. Oberleitner
*Assistant Examiner*—S. Joseph Morano
*Attorney, Agent, or Firm*—Evenson, McKeown, Edwards & Lenahan

[57] ABSTRACT

A recreational apparatus has, on a trough-shaped runway, a car which is driven by an electric motor and which is supplied with electric power by way of a trolley from a contact wire. The front axle of the car is designed so as to be self-steering so that the car finds its way on the runway through an interaction of the speed-dependent centrifugal force and the gravitational force acting on said car due to the inclined position of the car.

6 Claims, 2 Drawing Sheets

SELF STEERING RECREATIONAL APPARATUS FOR TROUGH-SHAPED RAILWAYS

BACKGROUND OF THE INVENTION

This invention relates to a recreational apparatus with a trough-shaped runway and at least one four wheel car with a self-steering front axle.

Recreational apparatuses of the aforementioned kind are generally known under the term "summer bobsled run" and are frequently built in the mountains for better use of a slope. As an example of the state of the art reference is made to DE-OS 29 17 074, which shows a four wheel car with self-steering front axle for such a recreational apparatus with a trough-shaped runway. In the known cars the front wheels are mounted on a rigid axle beam, which in turn can swing around an axle bolt, which is sloped in the center of the car from the top to the front bottom. In this manner the front axle steers automatically to the right, when its left front wheel is lifted owing to the arch of the runway, and automatically to the left, when its right front wheel, is lifted owing to the arch of the runway. In this manner the car automatically has the tendency to steer to the lowest region of the chute-like runway, and an equilibrium between the centrifugal force moving the car to the outside and the steering tendency to the lower region of the runway is obtained in the curves. Furthermore, the oscillating axle design enables the driver to tilt into the curve with the car in order to maintain equilibrium.

The drawback with the known recreational apparatuses is that they can be used only in the mountains on account of the necessity of a slope. For flat land there are no comparable recreational apparatuses. There are, of course, so-called go-cart apparatuses, where motorized vehicles drive on a usually flat runway. The vehicles are designed with an understanding of motor vehicles and have a front axle that is steered by means of a steering wheel. Therefore, go-cart vehicles do not produce the feeling of a sled ride on a bobsled run.

SUMMARY OF THE INVENTION

The invention is based on the problem of designing a recreational apparatus of the aforementioned kind in such a manner that it can be used on flat ground, yet produces in the users the feeling of a sled ride.

This problem is solved according to the invention by providing an electric motor in the car and supplying power to the electric motor the car by connecting the car, by way of a trolley, to an electric contact wire along the runway.

By equipping, according to the invention, a bobsled-like, self-steering vehicle with an electric motor one can also drive on a runway without a gradient as on a bobsled run. Since the car according to the invention is self-steering, it does not drive like a rail-bound vehicle on a precisely fixed line but, similar to a sled, drives primarily as a function of the curve velocity more or less far toward the outer edge of the curve of the runway. Therefore, the vehicle of the recreational apparatus according to the invention does not produce the feeling of a go-cart or a rail-bound vehicle, but rather that of a sled ride. Since the electric motor is supplied with electric power by way of a trolley and a contact wire, adequately high drive power can be obtained in order to reach high driving speeds that are typical of bobsledding.

The contact wire can run, for example, on the side of the trough-shaped runway. The recreational apparatus is designed especially simply, when the contact wire is arranged above the runway.

The front axle of the car can exhibit different designs. An especially simple and advantageous design has the front axle having a pivoted bolster which is mounted on the center line of the vehicle and can be pivoted at least in a somewhat vertical axis of rotation and on whose outer ends a front wheel is attached and whose axis of rotation is offset relative to the front wheels toward the front. The result of such a drawn pivoted bolster is that, when the car tilts around its longitudinal axis, the car moves with the axis of rotation of the pivoted bolster automatically in the direction of tilt, whereas the front wheels maintain their position. The result is that the pivoted bolster swivels in such a manner that the steering angle is in the direction of the gradient. Therefore, the car has the tendency to steer always into the lowest region of the chute-like runway. After taking a curve, the car moves rapidly again into the central region of the chute-like runway in straight driving, when the pivoted bolster is prestressed by means of at least one spring in a central position resulting in straight driving.

The car is of an especially simple design, when the pivoted bolster has a T-shape design and from its cross piece behind the axis of rotation leads a tension spring to a fixed point in the vicinity of the center line of the vehicle.

An alternative embodiment to that with the pivoted bolster consists of the front axle having a rigid axle beam, which bears the two front wheels and which can be pivoted on an axle bolt, which is sloped on the center line of the vehicle and whose upper end slopes toward the rear with respect to a perpendicular line. Such a front axle does not steer primarily due to the fact that the car moves sideways relative to the front wheels in the direction of the tilt of the runway, but rather that the front wheels on the one or the other side of the vehicle are lifted, thus resulting in a steering angle.

Extensive driving tests have demonstrated that an optimal cornering on a chute-like runway cannot be obtained either with a drive bolster or with the axle beam alone that can be pivoted around an axle bolt sloped toward the front bottom. Surprisingly it has been found that the car steers optimally if both self-steering principles are combined. Such a design is characterized by the fact that the axle bolt with the axle beam is attached spatially behind the axis of rotation to a pivoted bolster which is mounted on the center line of the vehicle and can be pivoted at least in a somewhat vertical axis of rotation and a pair of front wheels attached to the outer ends thereof and whose axis of rotation is offset toward the front relative to the front wheels. Preferably, the pivoted bolster is prestressed by means of at least one spring in a central position to thereby result in straight driving. Also, preferably, the pivoted bolster has a T-shape design having a cross piece behind the axis of rotation leading at least one tension spring to a fixed point in the vicinity of the center line of the vehicle. By means of such a combined axle, the car moves rapidly again out of its inclined position after taking a curve. Through the combined axle, the driver has the option of bringing the car into the optimal inclined position by displacing the weight and of driving the car on the ideal line through the curve.

BRIEF DESCRIPTION OF THE DRAWINGS

This invention permits numerous embodiments. To further elucidate the basic principle, one embodiment is shown in the appended drawings wherein.

DESCRIPTION OF THE PREFERRED EMBODIMENT

Figure 1:
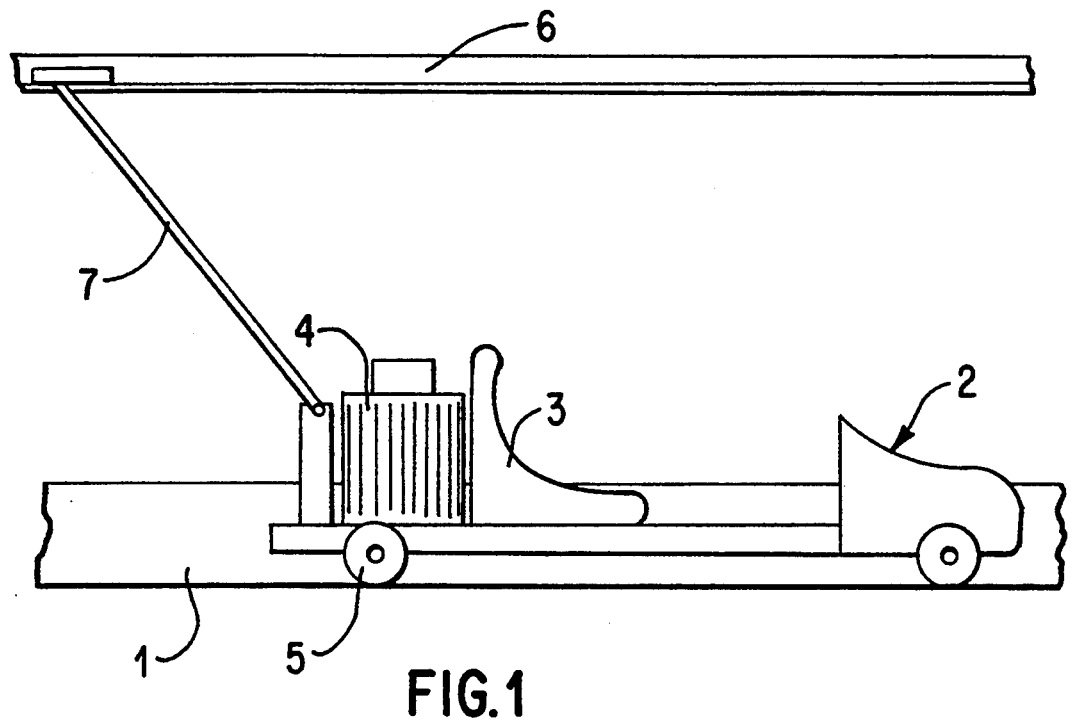
FIG. 1 is a schematic side view of a subregion of the recreational apparatus according to the invention.

FIG. 1 shows a runway 1, which can be made of a non-rusting steel and is designed like a chute similar to a bobsled run. A car 2 can drive on this runway 1. Behind seat 3 of car 2 is mounted an electric motor 4, which can drive rear wheels 5. The power to the electric motor 4 is supplied by a contact wire 6, which runs in the center above the runway 1 and with which the car 2 communicates by way of a trolley 7.

Figure 2:
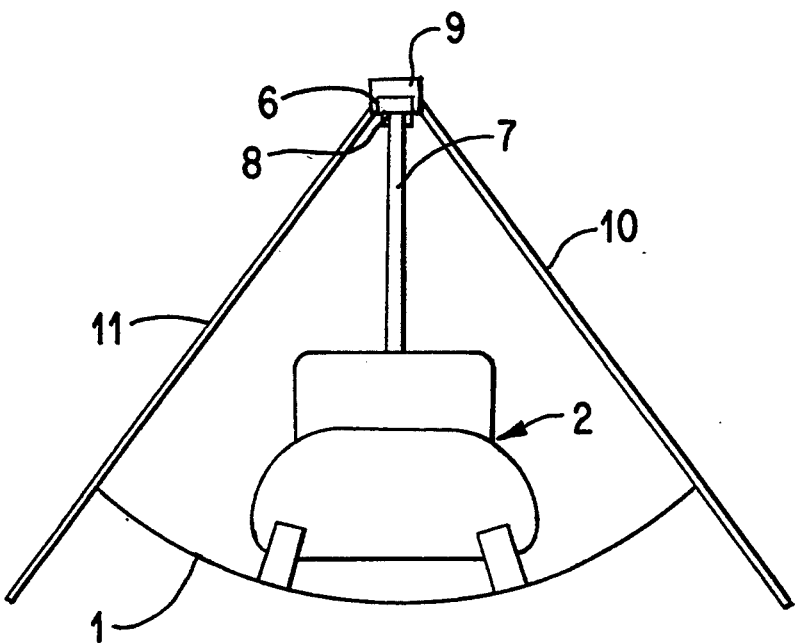
FIG. 2 is a schematic cross sectional view of the recreational apparatus according to FIG. 1.

It is evident from FIG. 2 that the runway 1 is arched like a chute. It is also apparent that the contact wire 6 rum in an electrically insulating rail 9 that is open toward the bottom only through a slot 8. The rail 9 is carried by supports 10, 11 that are sloped toward the bottom.

Figure 3:
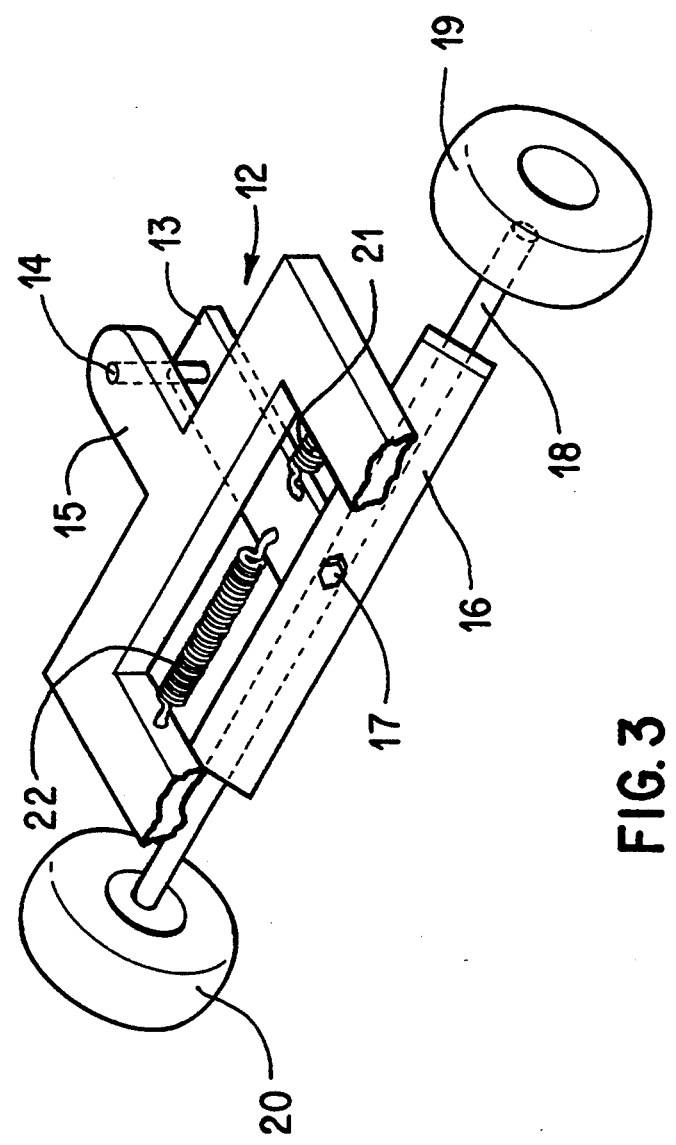
FIG. 3 is a schematic perspective view of the front axle of a car according to the invention.

The principle of automatic steering of the front axle of the car 2 is important for the invention. FIG. 3 shows this the best.

FIG. 3 shows a T-shaped pivoted bolster 12. It has on a cross piece 13, pointing to the front, an axis of rotation 14 that is somewhat perpendicular or slightly sloped and by way of which it is connected swiveably to a region of a car frame 15. On the end opposite the axis of rotation 14 the pivoted bolster 12 has a plate 16 that extends diagonally to the cross piece 13 and that slopes so as to tilt from the front top to the rear bottom. On the center of the plate 16 an axle bolt 17 is attached at right angles to the plate 16, which in accordance with the tilt of the plate 16 slopes from the top to the front in the direction of the bottom. On this axle bolt 17 a rigid axle beam 18 can be swivelled that abuts the plate 16 and bears on its free ends a front wheel 19, 20.

The pivoted bolster 12 is prestressed in the straight position by two springs 21, 22 designed as tension springs. To this end, each of the tension springs 21, 22 is attached, on the one hand, to the vehicle frame 15, on the other hand, to the cross piece 13.

If, for example, when taking a curve, the left front wheel 20 is lifted, then the axle beam 18 swivels around the axle bolt 17. Owing to its sloped course, the result is a steering angle of the front axle to the right. Therefore, the car always steers in the direction of a gradient and thus automatically into a curve. A comparable steering movement also occurs when the car 2 is in a tilt position due to the fact that on account of the weight the car with the vehicle frame 15 and thus also the axis of rotation 14 moves in the direction of the incline of the gradient. This leads to a clockwise steering angle of the pivoted bolster 12, when the vehicle frame moves to the fight, as seen in FIG. 3.

What is claimed is:

1. A recreational apparatus comprising a trough-shaped runway, an electric contact wire along the runway, and at least one four-wheel car having a self-steering front axle, an electric motor as a drive, and a trolley connected to said contact wire to supply power to the electric motor wherein the front axle comprises a bolster pivotally mounted on the center line of the vehicle about an essentially vertical axis of rotation and a pair of front wheels attached to the outer ends thereof, said axis of rotation being off-set toward the front of the car relative to the front wheels.

2. A recreational apparatus, as claimed in claim 1, wherein the pivoted bolster is prestressed in a central position by means of at least one spring to thereby result in straight driving.

3. A recreational apparatus, as claimed in claim 1, wherein the pivoted bolster is T-shaped having a cross piece behind the axis of rotation, further comprising at least one tension spring connecting said cross piece to a fixed point in the vicinity of the center line of the vehicle.

4. A recreational apparatus, as claimed in claim 1, wherein the front axle comprises a rigid axle beam said front wheels being mounted at opposite ends thereof, said axle beam being pivotally supported by an axle bolt which is sloped on the center line of the vehicle, the upper end of said axle bolt sloping toward the rear of the vehicle with respect to a perpendicular line.

5. A recreational apparatus, as claimed in claim 4, wherein the axle bolt with the axle beam is attached spatially behind the axis of rotation to the pivoted bolster.

6. A recreational apparatus comprising:
   (A) a trough-shaped runway;
   (B) an electric contact wire along the runway; and
   (C) at least one four-wheel car having a self-steering front axle, an electric motor as a drive, and a trolley connected to said contact wire to supply power to the electric motor;

said front axle comprising:
   (D) a bolster pivotally mounted on the center line of the vehicle about an essentially vertical axis of rotation,
   (E) a rigid axle beam,
   (F) a pair of front wheels mounted at opposite ends of said axle beam pivotally supported by an axle bolt which is sloped on the center line of the vehicle, the upper end of said axle bolt sloping toward the rear of the car with respect to a perpendicular line,
      (1) said axis of rotation being offset toward the front of the car relative to the front wheels, and
      (2) said pivoted bolster being T-shaped and having a cross piece behind the axis of rotation, and
   (G) at least one tension spring connecting said cross piece to a fixed point in the vicinity of the center line of the vehicle.

* * * * *